June 12, 1928.  
B. T. WILLISTON  
VALVE  
Filed April 4, 1927  
1,673,058  
2 Sheets-Sheet 1
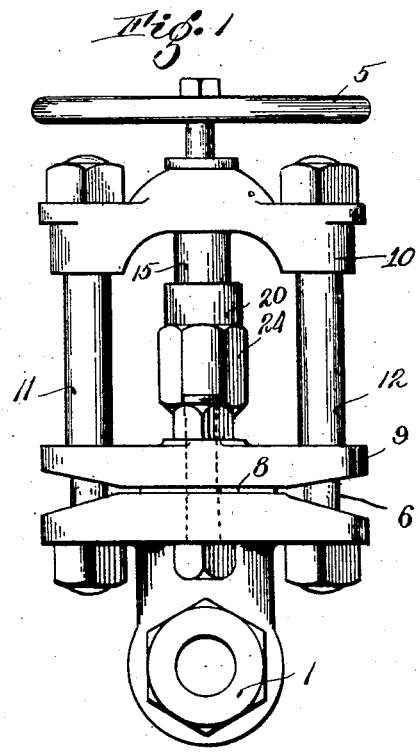
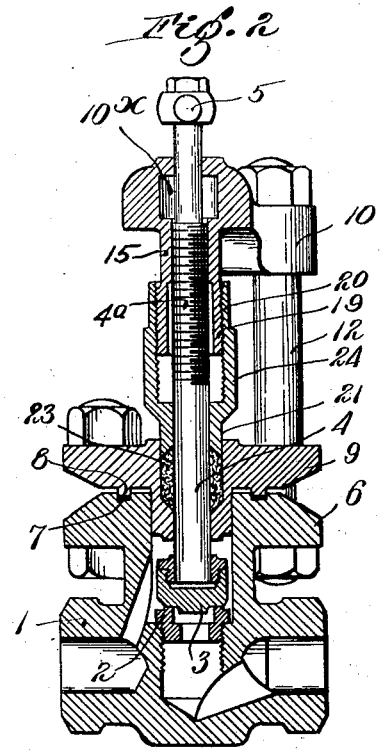
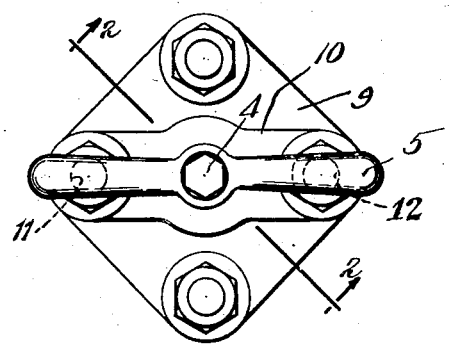
Inventor  
Belvin T. Williston  
by Roberts Cushman & Woodberry  
Attys.

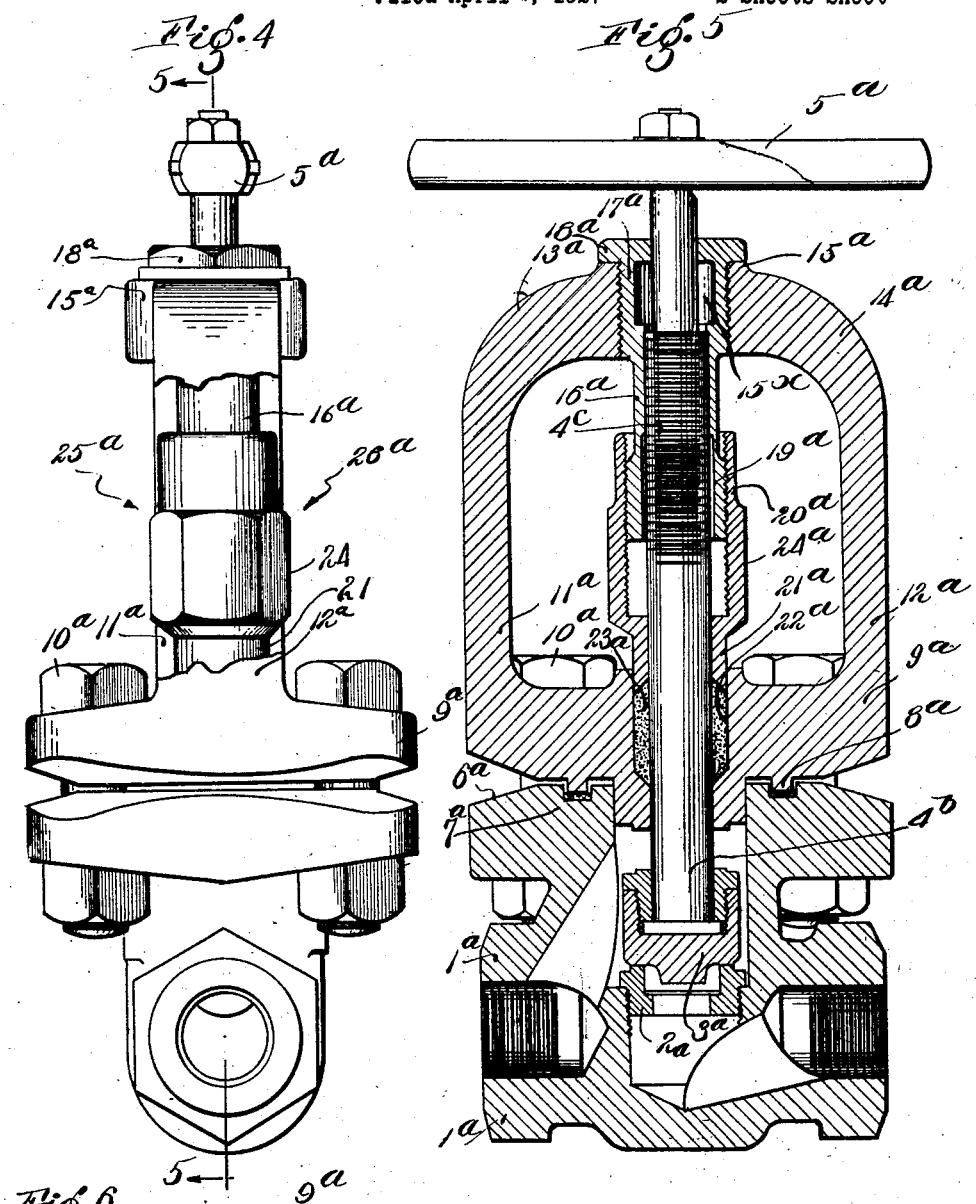
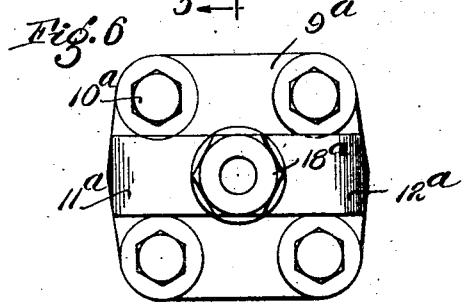

Patented June 12, 1928.

1,673,058

UNITED STATES PATENT OFFICE.

BELVIN T. WILLISTON, OF SOMERVILLE, MASSACHUSETTS, ASSIGNOR, BY MESNE ASSIGNMENTS, TO CONSOLIDATED ASHCROFT HANCOCK COMPANY, OF NEW YORK, N. Y., A CORPORATION OF DELAWARE.

VALVE.

Application filed April 4, 1927. Serial No. 180,636.

This invention pertains to valves of the type employed for controlling fluid under pressure and which comprise a stationary valve seat and a valve head reciprocable toward and from the seat. In my prior Patent No. 1,573,108, dated February 16, 1926, I have disclosed a valve of the above type and the present invention constitutes an improvement on the patented valve. Objects of the present invention are to provide adequate protection for the threaded portion of the valve stem, to facilitate packing of the valve stem and adjustment of the packing gland, and the simplification of the device by reduction in the number of parts, although without sacrifice of functional utility.

In the accompanying drawings in which I have illustrated certain desirable embodiments of the invention, Fig. 1 is a side elevation showing a completed valve structure of preferred construction;

Fig. 2 is a vertical section on the line 2—2 of Fig. 3;

Fig. 3 is a plan view of the valve shown in Figs. 1 and 2;

Fig. 4 is a side elevation of a valve of modified construction, certain portions being broken away;

Fig. 5 is a vertical section on the line 5—5 of Fig. 4; and

Fig. 6 is a plan view of the valve of Figs. 4 and 5, omitting the valve stem.

Referring to the drawings, the valve body 1 is provided with the usual annular seat 2 with which the valve head 3 cooperates to control the flow of fluid through the passages in the valve body. The valve head is connected in any suitable manner to a valve stem 4 which is preferably smooth at its upper and lower parts but is externally screw-threaded at $4^a$ and which is provided with an actuating handle 5 at its upper end.

The upper surface 6 of the valve body is preferably provided with an annular channel 7 concentric with the valve stem, and this channel receives an annular rib 8 projecting from the lower surface of the base member 9 of a bonnet. Packing material may be interposed between the rib 8 and the bottom of the channel 7 if desired. In its preferred form, the valve bonnet comprises the base member 9 and the top or yoke member 10, said members being held in properly spaced and assembled relation by means of shouldered bolts or posts 11 and 12, which are substantially parallel to the axis of the valve stem 4, and spaced laterally therefrom. The central part of the yoke member 10 is provided with a depending cylindrical sleeve-like member 15, having a screw-threaded bore for the reception of the threaded portion $4^a$ of the valve stem.

The lower end 19 of the part 15 is externally screw threaded for engagement with the upper internally screw-threaded portion 20 of a tubular packing gland. The lower end 21 of this gland engages a stuffing box in the base 9 of the bonnet and concentric with the stem 4. Within this stuffing box suitable packing material 23 is placed.

The central part 24 of the gland is preferably of polygonal external contour to permit the application of a wrench thereto for turning the gland relatively to the sleeve 15. By so turning this gland it may be adjusted axially of the valve stem, thus determining the degree of compression of the packing material in the stuffing box.

The posts or bolts 11 and 12 are spaced apart as above stated, so as to expose the gland for free application of a wrench. As thus constructed, it is easy to turn the gland to adjust the compression of the packing 23 or to give access to the stuffing box for the renewal of the packing, and as the tubular portion 20 of the gland encloses the lower end of the part 15, the threaded part of the stem is protected throughout its entire length. Preferably I provide a chamber $10^x$ surrounding the upper unthreaded part of the valve stem and adapted to contain lubricating material. The part 15 not only constitutes a nut for cooperation with the valve stem, but also furnishes a fixed abutment for the packing gland so that the number of parts is thus reduced to a minimum. The new valve structure is very compact, while at the same time the parts are readily accessible and are of such shape as to facilitate production and to reduce the cost of manufacture to a minimum.

In the modified construction shown in Figs. 4, 5, and 6, the valve body $1^a$ is provided with the usual annular seat $2^a$ with which the valve head $3^a$ cooperates in the same manner as above described. The valve head $3^a$ is furnished with a stem $4^b$ which is preferably smooth at its upper and lower parts but is externally screw threaded at 4ᶜ and which is provided with the actuating handle 5ᵃ at its upper end. As in the previously described modification the upper surface 6ᵃ of the valve body is preferably provided with an annular channel 7ᵃ concentric with the valve stem, and this channel receives an annular rib 8ᵃ projecting from the lower surface of the base member 9ᵃ of the bonnet. Preferably suitable packing material is interposed between the rib 8ᵃ and the bottom of the channel 7ᵃ. The member 9ᵃ of the bonnet is attached to the valve body by means of bolts 10ᵃ or in any other suitable manner.

In this instance the bonnet comprises a plurality of posts or arms 11ᵃ and 12ᵃ secured to the base member 9ᵃ and projecting upwardly therefrom as here shown. These arms are preferably disposed symmetrically with respect to the axis of the valve 10 and extend in substantially parallel relation up to the points 13ᵃ and 14ᵃ respectively where they are directed upwardly and merged into a boss 15ᵃ. This boss is furnished with an internally screw-threaded bore for the reception of a sleeve 16ᵃ. The upper part 17ᵃ of this sleeve is externally screw threaded for engagement with the internally screw-threaded bore of the boss 15ᵃ and the upper end of the sleeve is provided with a radial flange 18ᵃ preferably of polygonal contour for the application of a wrench by means of which the sleeve may be screwed down into the bore in the boss until the flange 18ᵃ bears firmly against the upper surface of the boss. This sleeve normally remains in this position during the life of the valve although it may be removed if necessary to facilitate replacement of the packing gland hereafter to be described. If desired a set screw or other means may be provided to secure the sleeve 16ᵃ in its normal position.

The lower end 19ᵃ of the sleeve 16ᵃ is of smaller diameter than its upper end 17ᵃ, and this lower end is externally screw threaded for engagement with the upper internally screw-threaded portion 20ᵃ of a tubular packing gland. The lower end 21ᵃ of this gland engages a stuffing box 22ᵃ in the base 9ᵃ of the body and concentric to the stem 4ᵃ. Within the stuffing box suitable packing material 23ᵃ is placed.

The central part 24ᵃ of the gland is preferably of externally polygonal contour to facilitate application of a wrench thereto for turning the gland relatively to the sleeve 16ᵃ. By so turning this gland it may be adjusted axially of the valve stem thus determining the degree of compression of the packing material in the stuffing box.

The sleeve 16ᵃ is internally screw threaded for engagement with the threaded portion 4ᶜ of the valve stem, and the sleeve 16ᵃ thus constitutes a nut cooperating with the valve stem to produce the axial movement of the latter for opening and closing the valve.

The arms 11ᵃ and 12ᵃ of the bonnet are relatively narrow circumferentially to leave large openings 25ᵃ and 26ᵃ at opposite sides of the bonnet freely exposing the gland for the application of a wrench. It is also to be noted that the arms 11ᵃ and 12ᵃ are spaced radially from the valve stem a substantial distance so as to permit the wrench to be manipulated freely without interference from the arms 11ᵃ and 12ᵃ.

As thus constructed, it is easy to turn the gland to adjust the compression of the packing 23ᵃ or to give access to the stuffing box for the renewal of the packing. The sleeve 16ᵃ not only constitutes a nut for cooperation with the valve stem but also furnishes an abutment for the packing gland, so that the number of parts in this instance also is reduced to a very few, while the sleeve and gland cooperate to enclose and protect the screw-threaded portion of the valve stem.

In this construction also, I prefer to provide an oil chamber, indicated at 15ˣ surrounding the upper unthreaded part of the valve stem, the oil flowing down from this chamber on to the threaded part of the stem.

While in this instance, I have shown the bonnet as provided with two arms, I contemplate that more or less arms may be used under some circumstances provided that sufficient space be left to give free access to the gland. I also contemplate that minor changes in shape and relative arrangement of the parts may be made without departing from the spirit of the invention.

I claim:

1. A valve of the class described comprising a body having a valve seat therein, a valve head cooperable with the seat, a stem connected to the valve head, the stem having an externally screw-threaded portion, a bonnet attached to the valve body, said bonnet carrying an elongate part provided with screw threads which engage the screw-threaded portion of the stem, the bonnet also comprising spaced posts supporting said elongate part and having a stuffing box chamber concentric with the valve stem, and a packing gland concentric with the valve stem, said gland being rotatable and having screw threaded engagement with screw threads upon said elongate part.

2. A valve of the class described comprising a body having a valve seat therein, a valve cooperable with the seat, a stem connected to the valve head, the stem having an externally screw-threaded portion, a bonnet attached to the valve body, said bonnet having spaced arms supporting an internally screw-threaded sleeve engaging the screw-threaded portion of the stem, and a packing gland concentric with the valve stem, said gland having screw-threaded engagement with said sleeve.

3. A valve of the class described comprising a body having a valve seat therein, a valve head cooperable with the seat, a stem connected to the valve head, the stem having an externally screw-threaded portion, a bonnet attached to the valve body, said bonnet having a stuffing box chamber concentric with the valve stem and spaced arms supporting an internally screw-threaded sleeve engaging the screw-threaded portion of the stem, and a tubular packing gland concentric with the valve stem, one end of the gland normally seating in the stuffing box in the bonnet, the opposite end of the gland being internally screw-threaded and engaging an externally screw-threaded portion of said sleeve.

4. A valve of the class described comprising a body having a valve seat therein, a valve head cooperable with the seat, a stem connected to the valve head, said stem having an externally screw-threaded portion, a bonnet attached to the valve body, said bonnet comprising a pair of diametrally opposed posts, means connecting said posts, said connecting means supporting an internally screw-threaded sleeve engaging the threaded portion of the valve stem, said sleeve having an externally screw-threaded portion, and a packing gland concentric with the sleeve, said gland having screw-threaded engagement with the externally screw-threaded portion of the sleeve.

5. A valve of the class described comprising a body having a valve seat therein, a valve head cooperable with the seat, a stem connected to the valve head, said stem having an externally screw-threaded portion, a bonnet having a base attached to the valve body, said base having a stuffing box concentric with the valve stem, diametrally opposed posts projecting upwardly from the base, an elongate part provided with screw threads, said part being supported by said arms and having its said screw threads engaging the threaded portion of the stem, and a packing gland projecting into the stuffing box, said gland also having screw threaded engagement with screw threads upon said elongate part, the gland being exposed between the supporting posts and being adjustable axially of the stem by rotating the same, the posts being spaced to permit application of an adjusting tool to the gland.

6. A valve of the class described comprising a body having a valve seat therein, a valve head cooperable with the seat, a stem connected to the valve head, said stem having an externally screw-threaded portion, a bonnet having a base, means attaching the base to the valve body, the base having a stuffing box concentric with the valve stem, substantially parallel posts projecting from diametrally opposite sides of the base, the posts supporting an internally screw-threaded element engaging the threaded part of the stem, and a packing gland projecting into the stuffing box, said gland having a polygonal peripheral surface for engagement by a wrench, the gland being axially adjustable by rotating it, the posts being narrow in a circumferential direction so as to expose the gland for application of a wrench.

7. A valve of the class described comprising a body having a valve seat therein, a valve head cooperable with the seat, a stem connected to the valve head, said stem having an externally screw threaded portion, an elongate packing gland concentric with the stem, a bonnet secured to the valve body, said bonnet having a stuffing box therein for reception of one end of the packing gland, and a member supported by the bonnet at a point spaced axially of the stem from the stuffing box and having screw threaded engagement with the valve stem and the other end of the gland, the gland being freely exposed at all times for adjustment.

8. A valve of the class described comprising a body having a valve seat therein, a valve head cooperable with the seat, a stem connected to the valve head, said stem having an externally screw-threaded portion, a bonnet engaging the valve body, packing interposed between the bonnet and body, means detachably uniting the bonnet and body, the bonnet having a stuffing box concentric with the valve stem, a gland having one end disposed in the stuffing box, and a part supported by the bonnet and having screw-threaded engagement with both the valve stem and gland, the bonnet having an opening in its side to expose the gland.

9. A valve of the class described comprising a body having a valve seat therein, a valve head cooperable with the seat, a stem connected to the valve head, said stem having an externally screw-threaded portion, a packing gland concentric with the valve stem, a bonnet surrounding the packing gland, said bonnet having large openings to give free access to the gland, means attaching the bonnet to the valve body, and means carried by the bonnet having screw-threaded engagement with both the valve stem and gland.

10. A valve of the class described comprising a body having a valve seat therein, a valve head cooperable with the seat, a stem connected to the valve head, said stem having an externally screw-threaded portion, a bonnet, means attaching the bonnet to the valve body, a packing gland concentric with the valve stem, and a fixed sleeve supported at one end by the bonnet, said sleeve being externally threaded at its other end for engagement with an internally screw-threaded portion of the gland, the sleeve being also internally screw-threaded for engagement with the valve stem.

11. A valve of the class described comprising a body having a valve seat therein, a valve head cooperable with the seat, a valve stem secured to the valve head, said stem having a screw-threaded portion, a bonnet comprising a base attached to the valve body, posts extending from the base substantially parallel to the axis of the valve stem, a transverse yoke detachably secured to said posts, said yoke being provided with a depending sleeve-like boss, said sleeve-like boss having an internally screw-threaded bore, the lower end portion of said sleeve-like boss being externally screw threaded, and a tubular packing gland concentric with the valve stem, one end of said gland entering a stuffing box in the base of the bonnet, and its opposite end being internally screw-threaded for engagement with the externally screw-threaded end portion of the sleeve-like boss.

12. A valve of the class described comprising a valve seat therein, a valve head cooperable with the seat, a stem secured to the valve head, said stem having an externally screw-threaded portion, a bonnet secured to the valve body, said bonnet having a bore for the passage of a part of the valve stem and an oil chamber surrounding the stem, nut means carried by the bonnet engaging the screw-threaded portion of the stem, and a tubular member cooperable with said nut means to enclose and protect the screw-threaded part of the stem throughout its entire length.

Signed by me at Boston, Massachusetts, this 28th day of March, 1927.

BELVIN T. WILLISTON.